Figure 1:
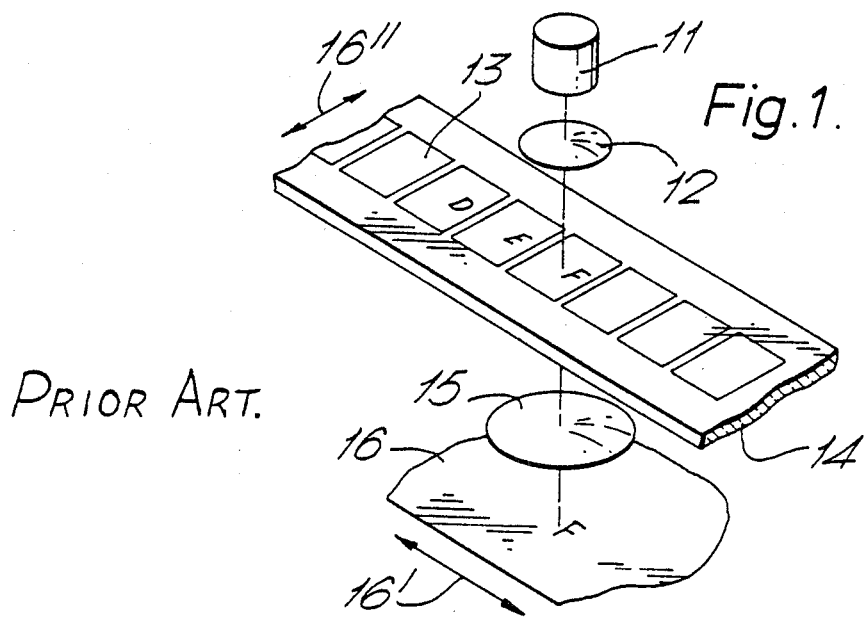

United States Patent [19]

Coulter

[11] Patent Number: 4,486,081
[45] Date of Patent: Dec. 4, 1984

[54] OPTICAL IMAGE PROJECTOR

[75] Inventor: Albert G. Coulter, Edinburgh, Scotland

[73] Assignee: Ferranti plc, Cheshire, England

[21] Appl. No.: 324,478

[22] Filed: Nov. 24, 1981

[30] Foreign Application Priority Data

Nov. 29, 1980 [GB] United Kingdom ............... 8038411

[51] Int. Cl.³ ............................................. G03B 21/00
[52] U.S. Cl. ................................... 353/27 R; 353/97; 353/88
[58] Field of Search ............... 353/88, 97, 26 R, 27 R, 353/27 A, 82, 89, 25, 38; 355/54, 40, 41, 46, 71

[56] References Cited

U.S. PATENT DOCUMENTS

| | | | |
|---|---|---|---|
| 2,357,593 | 9/1944 | Leavell | 353/88 X |
| 2,947,217 | 8/1960 | McWhirter | 355/41 |
| 3,284,923 | 11/1966 | Leslie | 353/26 R X |
| 3,642,360 | 2/1972 | Ataka | 353/38 |
| 3,644,019 | 2/1972 | Bestenreiner | 353/97 X |
| 3,674,365 | 7/1972 | Kohler | 355/40 |
| 3,712,724 | 1/1973 | Pratt | 353/25 |
| 3,715,157 | 2/1973 | Worthington, Jr. | 353/89 X |
| 3,881,815 | 5/1975 | McGourty | 353/97 |
| 4,232,962 | 11/1980 | Sauer | 355/46 |
| 4,310,240 | 1/1982 | Norris | 355/54 |

FOREIGN PATENT DOCUMENTS 1492866 7/1967 France ................................. 355/40

Primary Examiner—Harry N. Haroian
Attorney, Agent, or Firm—Kerkam, Stowell, Kondracki & Clarke

[57] ABSTRACT

An optical image projector suitable for projecting symbols in an artwork generator comprises a projector head beam relative to which a photographic film 16 can be positioned accurately. The head contains a source 11 of a beam able to illuminate an array of transparencies mounted on a carrier 17 which carrier may be moved between positions accurately defined by a detent mechanism 19, 20 to locate different arrays in the beam. A masking member 21 forming part of the projector head is movable past the carrier and interrupts the beam to prevent projection of all the symbols of the array but has one or more apertures 25 which can be aligned with any one transparency at a time to allow projection. Because the carrier need carry relatively few arrays it can be accurately positioned repeatedly within the projector head to align a symbol accurately with respect to the film while the masking member aperture may be positioned with only moderate accuracy for each of the larger number of transparencies.

21 Claims, 7 Drawing Figures

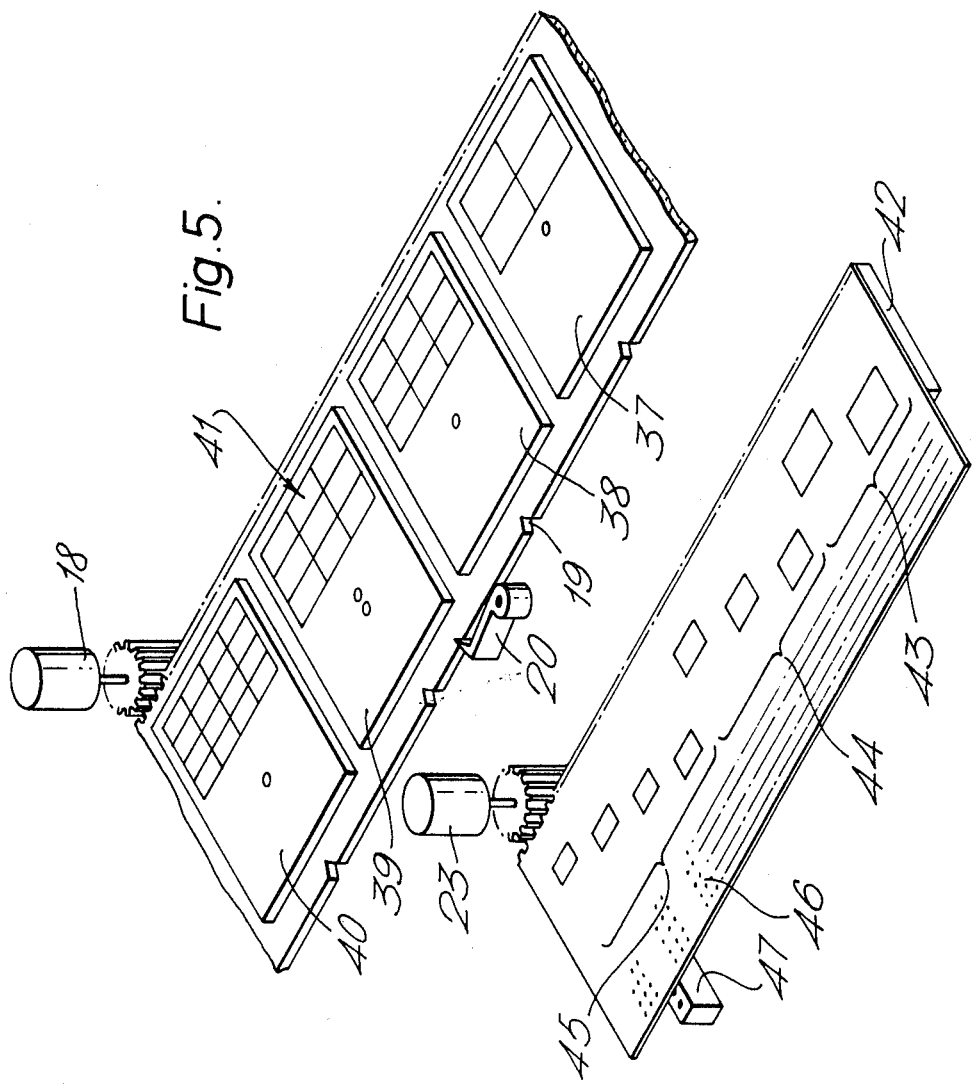

OPTICAL IMAGE PROJECTOR

This invention relates to optical image projectors and in particular to projectors in which individual ones of a plurality of stored image transparencies can be selected for display.

One problem which exists in projecting successive images onto an imaging medium, such as a screen or photographic medium, is maintaining an alignment or positional accuracy of the image as successive transparencies are moved into a projector light beam. Discrete images intended to be viewed in isolation may be indexed magazines as known for photographic slide projectors but where it is required to assemble an image from superimposed elemental images or to print a sequence of symbols, such as letters, the image transparencies must be located with great accuracy.

For instance in artwork generators where discrete symbols are projected it is known to provide a magazine or carrier with a linear or circular array of symbol image transparencies. Where the number of symbols required is large and to avoid an unacceptably large machine the transparencies are made of small size and located close together. It then becomes difficult to position the carrier for each symbol with an accuracy to maintain alignment between a succession of symbols. Heretofore such image projectors have had to compromise between alignment accuracy, size and the number of symbols carried.

It is an object of the present invention to provide a simple and compact optical image projector in which stored image transparencies can be positioned with greater accuracy than known arrangements.

According to the present invention an optical image projector comprises a transparency carrier, supporting a plurality of image transparencies arranged in a regular array thereon, operable to be located in one or more fixed positions with respect to a beam of light directed from a source and of such an area as to illuminate at each fixed position a plurality of the transparencies, masking means moveable relative to the carrier and apertured to define at each different position a projection path for a different one only of the transparencies within the area of the beam, drive means responsive to the selection of a desired transparency to position an imaging medium in alignment with the selected transparency and to locate the masking means with respect to the carrier to align the aperture with the transmission path through that transparency.

Figure 4:
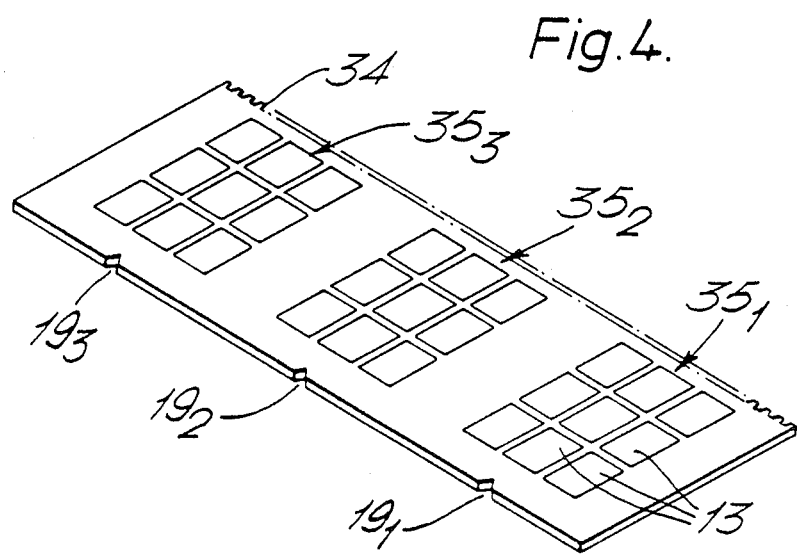
Figure 2:
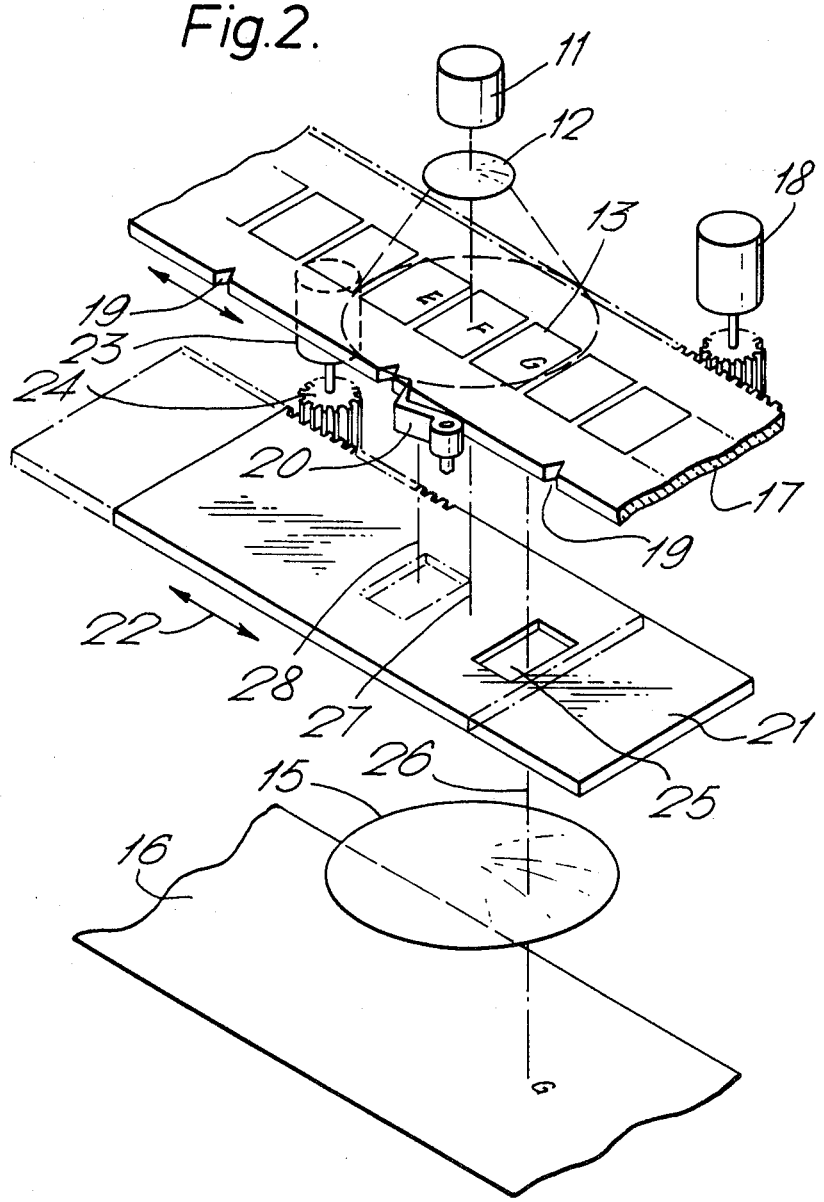
Figure 3:
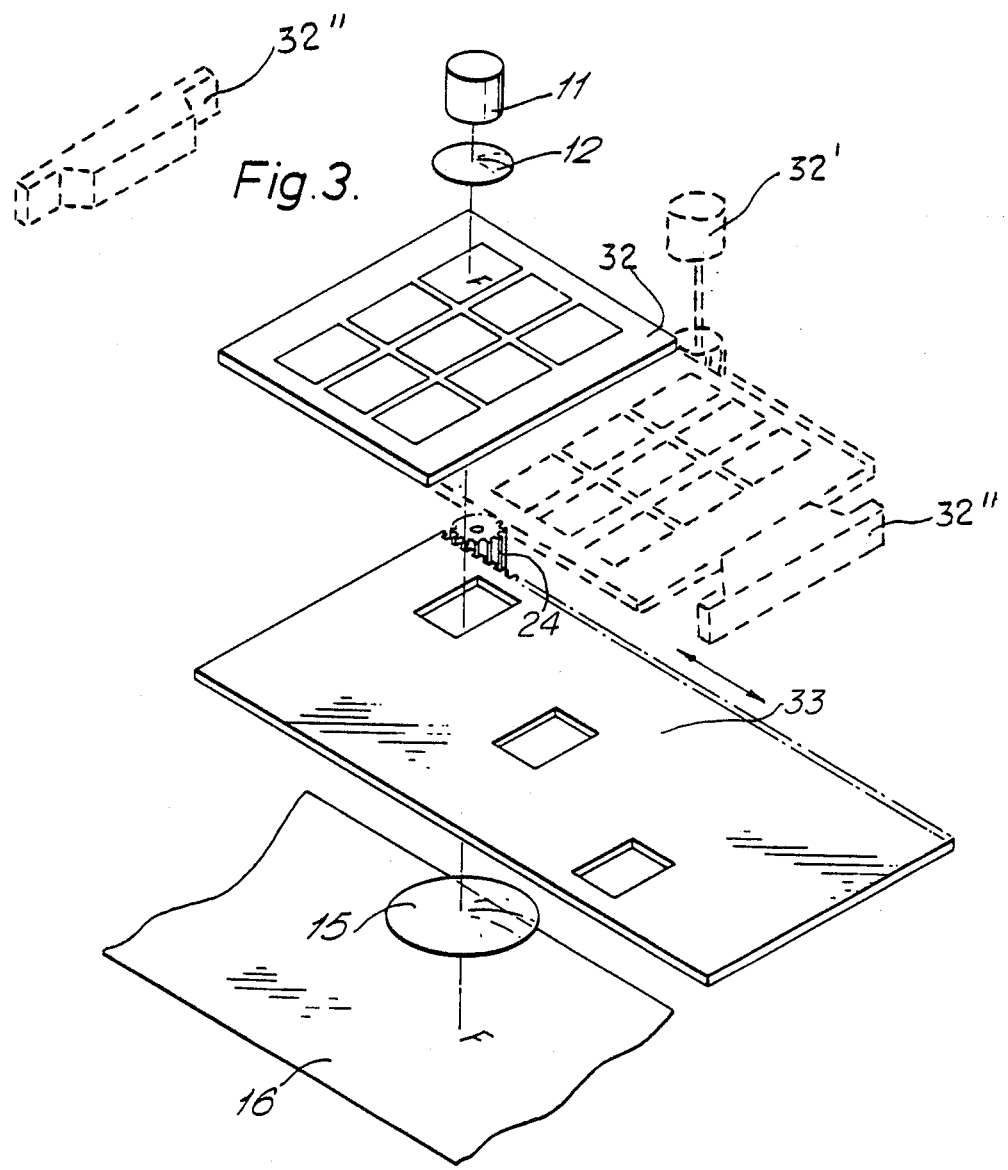
Figure 6:
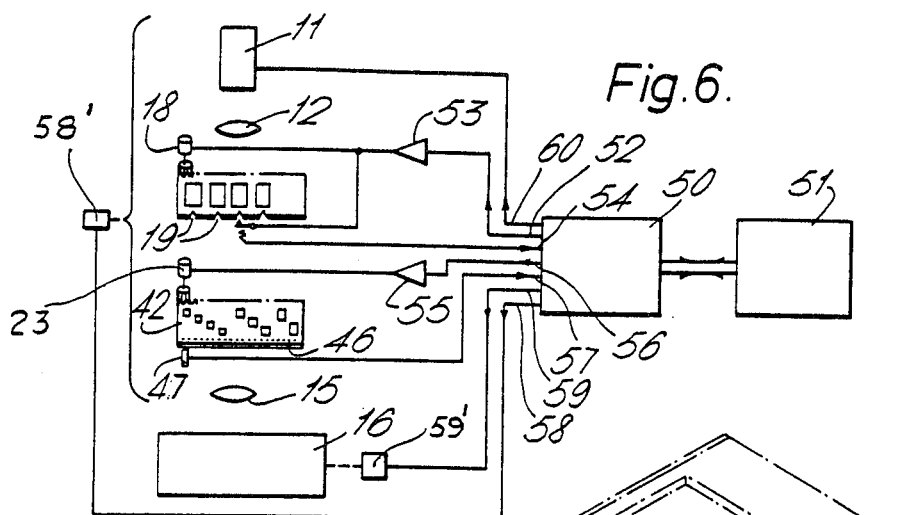
Figure 7:
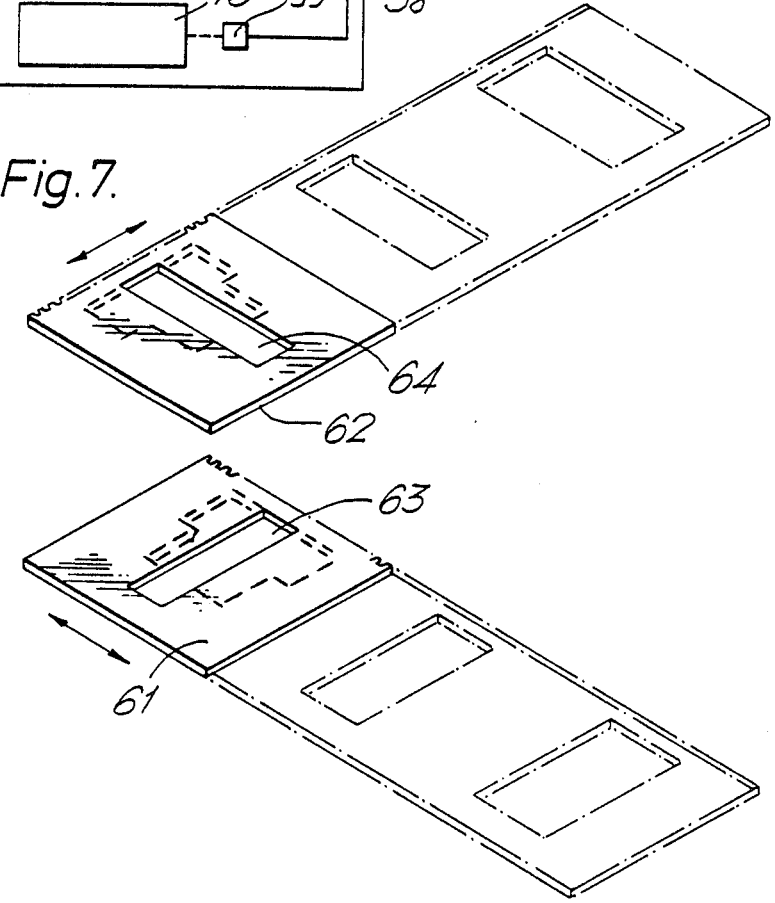

Embodiments of the present invention will now be described by way of example with reference to the accompanying drawings, in which:

FIG. 1 is perspective view of a form of symbol projector employed in an artwork generator, FIG. 2 is a perspective view of one form of symbol projector according to the present invention in which the image transparencies are arranged in a one-dimensional array, FIG. 3 is a perspective view of a second form of symbol projector in which the image transparencies are arranged in a two-dimensional array, FIG. 4 is a perspective view of a transparency carrier showing a combination of the features of the forms shown in FIG. 2 and FIG. 3, FIG. 5 is a perspective view of a third form of projector employing the principle shown in FIG. 3 but in which the transparency arrays are removable, FIG. 6 is schematic block diagram of the control interrelationships between the elements of the projector of FIG. 5, and FIG. 7 is a perspective view of an alternative form of masking means.

Referring to FIG. 1 a known artwork generator comprises a projector head consisting of a light source 11 a primary lens system 12 a plurality of image transparencies 13, each representing a different symbol, mounted on a transparency carrier 14 and a secondary lens system 15 arranged to focus the light beam as transmitted by one of the transparencies located in the beam onto an imaging medium, photographic film 16, producing thereon a sharp image of the transparency symbol.

In order to project the symbol image onto the correct location the photographic medium and projector head are movable relative to each other. The photographic film is supported on the projector machine bed (not shown) and may be moved in two orthogonal directions relative to the beam or preferably the film is supported by a carriage movable along one direction shown by arrow 16' and the projector head is supported by a carriage movable in an orthogonal direction relative to the machine bed shown by arrow 16''.

The accurate positioning of such carriages is conventional meachine practice and is not described in further detail.

With a typical artwork generator the number of symbols required tends to be large and although each symbol may be made small, problems arise in positioning the transparency accurately and repeatably with respect to the projector head carriage to achieve consistent spacing between the projected symbols or accurate superimposition of a symbol, say on a map, without the complexity and expense associated with positioning of the head and photographic film.

Continuously variable servo positioning of the carrier has an inherent inaccuracy in that the carrier position is always subject to the error of the servo loop. This may be avoided in principle by providing the carrier and projector body with mechanical detent means, adjacent each symbol transparency by which mechanical location the carrier can be repeatably repositioned. Any positioning error which is a function of the mechanical engagement will be consistent and can be allowed for by the transparency positioning on the carrier. However, the space required in order to provide satisfactory mechanical engaging means for each transparency requires the transparencies to be spaced from each other and for an average number of symbols the carrier becomes physically large.

Referring now to FIG. 2 which shows a similar view to FIG. 1 of an artwork projector but according to the present invention. In this embodiment the source 11 lens systems 12, 15 of the projector head and photographic medium 16 are as previously described, except that the primary lens system is arranged to cause the beam to illuminate a plurality of the transparencies, three as shown.

The transparency carrier 17 is reciprocable along the line of transparencies by a drive means 18, consisting of a motor and a rack gear, along one edge of the carrier and is provided along the opposite edge with detent mechanism comprising depressions 19 corresponding to each third transparency and arranged to be engaged mechanically by a releasable tongue 20 mounted on the projector head body and biased towards the carrier to locate the carrier accurately with respect to the projector head body. Masking means comprising a masking member 21 is located adjacent the carrier to intercept light transmitted by the transparencies and is movable parallel thereto along the directions shown by arrows 22. The masking member 21 is driven by a motor 23 through a rack gear 24 along the edge of the masking member between the limits shown by full and broken lines.

The line of transparencies on the carrier can be considered as an array extending parallel to the direction of movement of the carrier and having a single value in an orthogonal direction. The masking member has a single through-aperture 25 equal to, or slightly smaller than, a single transparency size and arranged to align with any one of the three illuminated transparencies by movement of the masking member for each detent position of the carrier so that light passing therethrough is centred on an axis 26, 27 or 28. By applying a suitable offset to the position of the photographic film 16 the area in which the image is to form is aligned with the appropriate axis of transmission.

The carrier is moved by withdrawing the tongue 20 from a depression into which it is spring biased and is positioned relative to the beam by motor 18 under the directions of external control means (not shown) such that a group of the transparencies containing the selected one is illuminated.

It will be appreciated that the locating precision afforded by the mechanical detent arrangement means that the symbols in any group are capable of precise positioning relative to the projector head and any imprecision in the movements made by the masking member do not effect the precision of the image position on the photographic film.

Referring now to FIG. 3 a second embodiment of the invention is illustrated and parts corresponding to those of FIG. 2 are given the same reference numerals.

The projector differs from that of FIG. 2 in that the transparency carrier 32 is fixed in relation to the projector head body and has transparencies arranged in a two coordinate array, (for example 3×3) so that they are all illuminated by the light beam. The masking member 33 is movable relative to the carrier in the same manner as masking member 21 (FIG. 2) along one coordinate of the array. The masking member has an aperture for each value of the other coordinate of the array, that is, three as shown. The apertures are spaced apart in the direction of motion so that only one of the apertures aligns with its corresponding transparencies at any one time. In this case there are nine positions which the masking member may assume to enable images from the nine transparencies to be projected. The beam displacement is compensated for by translation of the photographic film and the projector head to position the image correctly.

This arrangement is capable of greater accuracy than that of FIG. 2 as the absence of any movement between the carrier 32 and the remainder of the projector head ensures strict alignment between the projected images and the photographic medium. However even though the number of transparencies is maximised by employing a two-coordinate array the carrier is still capable of only supporting a limited number.

However, even though the number of transparencies supported by a fixed position carrier is maximized by employing a two-coordinate array, the carrier is still capable of supporting only a limited number of transparencies within the illumination beam. A compromise may be reached between the convenience of a larger number of transparencies with detent stops for accurate positioning and the accuracy of a fixed carrier with fewer transparencies. As shown in phantom lines in FIG. 3, the carrier 32 may be extended to include a second array of transparencies. The first and second arrays may be formed integrally with the carrier (for maximum accuracy) or as replaceable sub-carriers. The carrier is movable by a motor drive 32' through the projection beam between two positions defined by end stops 32" so that either one or the other of the transparency arrays is illuminated by the beam. By driving the carrier into abutment with an end stop 32" in each position it is possible to position the carrier with greater accuracy than with the multiple detent system of FIG. 2.

FIG. 4 shows a carrier arrangement employing the features of the carriers of FIGS. 2 and 3. The carrier 34 supports a plurality of arrays $35_1$, $35_2$, $35_3$ . . . of transparencies 13 each array being associated with a carrier positioning detent depression $19_1$, $19_2$ . . . . The carrier is positionable by means of the detent arrangement as described in relation to FIG. 2 but the light beam now illuminates the whole of the array associated with the positioning detent. The masking member (not shown) is identical with 33 shown in FIG. 3.

FIG. 5 shows a projector arrangement in which the transparency carrier 36 supports a plurality of sub-carriers 37–40 each of which carries an array of transparencies similar to the arrays 35 of FIG. 4, the sub-carriers being removably located on the carrier at locations associated with carrier positioning detents 19. In this way it is possible to use different sets of symbols in any particular operation, for example, the characters of different alphabets, without requiring all possible symbols permanently on the carrier. The carrier length and number of accurately definable detent positions may therefore be kept to a minimum.

It will be appreciated that within any array, either forming a part of the carrier as shown in FIG. 4, or on a sub-carrier as shown in FIG. 5, the individual transparencies may be of different sizes and form arrays of different size or different pitch.

Examples are shown in FIG. 5, sub-carrier 37 having four transparencies arranged in a 2×2 array, sub-carriers 38 and 39 having nine transparencies arranged in a 3×3 array and sub-carrier 40 having sixteen transparencies arranged in a 4×4 array. The masking member 42 has a first set 43 of two apertures each corresponding in size to the transparencies of sub-carrier 37, a second set 44 of three apertures each corresponding in size to the transparencies of sub-carriers 38 and 39 and a third set 45 of four apertures each corresponding in size to the transparencies of sub-carrier 40. Thus depending on the selected sub-carrier moved into the operative projection position the masking member is moved to align the relevent set of apertures with it. In this case all the arrays have the same overall size as determined by the common sub-carrier but it is possible to use arrays of different overall dimensions.

The decision as to which sets of apertures are used with which arrays may be manual and performed by an operator or may be partly or wholly controlled as part of the machine function.

The machine may be arranged that carrier locations are receptive only to sub-carriers having predetermined arrays and the relevant parts of the masking member are assigned to operate with those locations. Each sub-carrier may have a peripheral shape determined by the size and pitch of the transparency array it carries and the carrier may have co-operating recesses into which the sub-carriers fit. Alternatively the sub-carriers and carrier may be provided with a series of projections and recesses which define a code characteristic of the array on the sub-carrier. A line of pegs may be spaced at each sub-carrier location on the carrier at spacings representing a binary code and sub carriers may have recesses therein also in accordance with a binary code into which the pegs fit to locate the sub-carriers at permissible locations on the carrier.

Alternatively instead of assigning masking member aperture sets to specific preselected detent positions of the carrier the sub-carrier itself may determine which masking member portion is assigned to it. In such an arrangement (not shown) the carrier is provided with a line of switches (photodetectors) at each of the detent positions and the sub-carrier is provided with switch operating members (apertures) which align with the photodetectors, the number and position of the switch operating members (apertures) defining a code characteristic of the transparency array thereon. An electrical code signal characteristic of the sub-carrier is produced which can be used to assign a portion of the masking member to the sub carrier located in the beam. The switches may be mechanical or may comprise photodetectors and the switch operating members apertures in the sub-carrier by which illumination of the coded apertures by light from the, or another source, results in illumination of the associated photodetectors and production of the coded electrical signal.

Irrespective of the method used to determine which portion of the masking member is to be used with a selected illuminated transparency array the masking member has to be reciprocated to move the apertures of the relevent set to expose light transmission through the selected transparency. One means of control is shown on the masking member of FIG. 5. A scale 46 extends along the edge of the masking member consisting of a binary code of holes corresponding to each aperture and inter-aperture space. A reading head 47 provides a signal indicative of the position of the carrier with respect to the illuminated detent position and a servo system ensures that the masking member is driven (e.g. as shown in FIG. 2) to any desired position relative to the detent position.

The circuitry involved is conventional and need not be described in anything more than function to convey an understanding of the invention, and in practice consists of an electronic process controller 50 linked to a keyboard or other operator interface 51 as shown in FIG. 6. The processor has a first output 52 connected by way of a drive amplifier 53 to the carrier drive means 18, which output is also connected to the tongue 20 to release it from a detent depression 19 to permit movement of the carrier. The tongue 20 also includes switching means operable to feed a first (counter) input 54 of the processor each time the tongue engages (or is released from) a detent, each sub-carrier position being defined in terms of a preset number of detent positions from a datum position so that the processor moves the carrier through a succession of depression positions until the count measured equates with that demanded from a particular symbol selection of the keyboard.

The masking member drive means 23 is driven by way of drive amplifier 55 from a second output 56 of the processor and the masking member position reader 47 feeds a signal to a second input 57 indicative of the actual position of the masking member. The processor compares the actual position with the demanded position, determined by the processor from the known location on a sub-carrier of the selected symbol and drives the masking member until the appropriate sized aperture is aligned with the relevant symbol transparency. The processor also has a third output 58 connected to the projector head positioning means 58' and a fourth ouput 59 connected to the photographic film positioning means 59' to align the transparency and aperture with the desired position on the photographic film.

The processor has a fifth output 60 connected to the source to cause a beam of light to be produced in the projector only when the carrier, masking member, beam alignment means and photographic medium are in the correct juxtapositions and for a time determined by the characteristics of the photographic medium. The beam of light may be controlled by a shutter (not shown) so that light from the source can be employed in other positioning functions.

The processing circuit 50 shown in FIG. 5 conveniently comprises a computer which is programmed to store the relative positions of the carrier and masking member for each symbol selectable by the keyboard and perform the actual servo control function associated with the resultant positioning of the carrier, masking member and other elements. Such control circuits insofar as they are capable of independent operation may comprise separate circuits under the control of position demand signals from a simpler processor.

It will be appreciated that several modifications are possible to the arrangements described above in addition to the alternative mentioned above and may be implemented in suitable circumstances.

In all of the above described embodiments the carrier and masking member have reciprocated along the same axis. It will be appreciated that the masking member could move orthogonally to the carrier.

The masking member could be located between the source and the carrier. The masking means may comprise more than one member as shown in FIG. 7. Two masking members 61, 62 have slit apertures 63, 64 respectively. The members are movable opthogonally to each other along different coordinates of the array of transparencies. Each slit aperture has a width in the direction of movement corresponding to the width of one transparency and a length corresponding to the length of the array in that direction. Where the slit apertures overlap an aperture is formed of substantially the same dimensions as a single transparency and by adjusting the postions of the masking members relative to each other the aperture can be aligned with any transparency of the array.

As shown by broken lines the masking members may contain a number of slit apertures corresponding to transparency arrays of different size and/or pitch. It will be appreciated that by this coordinate definition of the aperture smaller individual masking members are required.

In a further modification, shown in phantom in FIG. 7, two masking members may each be movable in two orthogonal directions as described above, but each containing an aperture of varying dimensions. By this means the positioning of similarly sized apertures of the masking members relative to each other defines the size of the aperture corresponding to the selected transparency and the positioning of both masking members relative to the carrier aligns the aperture with the selected transparency.

Where the masking means comprises two members they may both be mounted at the same side of the carrier or may be mounted one on each side.

The processing circuit 50 in FIG. 6 may also be modified to store information relating to the positional error of any symbol in relation to the centre or edges of its transparency so that when the projector head and photographic film are aligned for any selected transparency the correction is automatically incorporated in the position taken up.

The transparencies, singly or in groups or sub-carriers may be mounted on a circular or arcuate carrier. If the transparencies are arrayed in a cartesian format as described above the masking member may move linearly as described, that is, tangential to the carrier, or along a parallel arcuate path.

The transparencies may be arranged in a non-cartesian format; for instance, on a circular carrier they may be as polar coordinates with different number and different spacings between transparencies of different rows.

In a readily understood alternative the carrier may comprise the peripheral wall of a cylinder such that the masking member moves coaxially around it.

The invention has been described with reference to an artwork generator in which each transparency is a symbol or character. Any other material normally projected from a transparency and for which precise registration is necessary may be employed.

I claim:

1. An optical image projector for projecting an image on an imaging medium, said projector comprising:
   a transparency carrier positionable at one or more accurately defined fixed positions and supporting at each of a plurality of fixed locations thereon a plurality of separate image transparencies arranged in a regular array associated with a defined position,
   a light source operable to produce a beam of such area as to illuminate, at each carrier fixed position, an area occupied by all of the image transparencies of the array associated therewith and to produce a corresponding array of image projection beam paths,
   masking means translatable relative to the carrier at each of said fixed positions and apertured to define at a plurality of translational positions a projection path for one only at a time of all the image projection beam paths of the associated array, and
   first drive means responsive to the selection of a desired image transparency for positioning the imaging medium in alignment with the image projection beam path of the desired image transparency and second drive means for positioning the masking means with respect to the carrier to align the aperture with the image projection path of that transparency.

2. A projector as claimed in claim 1 in which the carrier is arranged to support a plurality of arrays of different pitch containing transparencies of different sizes.

3. A projector as claimed in claim 2 including means operable to move the carrier transversely to the beam of light to interpose different groups of transparencies in the beam.

4. A projector as claimed in claim 3 wherein said means is operable to move the carrier between two positions in which the carrier is located by bearing against end stops.

5. A projector as claimed in claim 3 including a detent arrangement operable to lock the carrier in one of a plurality of predetermined locations relative to the beam.

6. A projector as claimed in claim 1 in which the, or each, array of transparancies comprises a sub-carrier removable from the carrier.

7. A projector as claimed in claim 6 in which the carrier and each sub-carrier are provided with means for identifying a location on the carrier, characteristic of the transparency size and array pitch, to which the sub-carrier may be attached.

8. A projector as claimed in claim 7 in which said means for identifying a location on the carrier comprises a coded set of cooperating projections and recess in the carrier and sub-carrier.

9. A projector as claimed in claim 8 in which the projections and corresponding recesses are arranged in a line spaced in accordance with a binary code.

10. A projector as claimed in claim 1 in which the masking means is located adjacent one side only of the carrier.

11. A projector as claimed in claim 10 in which the masking means is located adjacent the side of the carrier to intercept the beam after transmission through the transparencies.

12. A projector as claimed in claim 1 in which the masking means comprises a single masking member movable parallel to the carrier along one coordinate of the array and having therein, for each value of the other coordinate of the array, an individual aperture of substantially the same dimension as the transparencies of the array said apertures (if more than one) being displaced from each other in the direction of motion of the member such that only one of the apertures is able to align with its associated transparencies for any position of the member.

13. A projector as claimed in claim 1 in which the masking means comprises two masking members each movable parallel to the carrier along a different one of the coordinates of the array and each including, for each transparency size, a slit aperture extending for the width of one transparency in the direction of motion and for the width of the array transversely to the direction of motion and for the width of the array transversely to the direction of motion the slit apertures overlapping each other to define an aperture corresponding substantially in area with one of the transparencies of the array and alignable with any transparency within the area of the beam.

14. A projector as claimed in claim 1 in which the masking means comprises two masking members each movable along a respective coordinate of the array, each member having an aperture varying in size in accordance with transparency sizes of the arrays, the size of the aperture formed in any position being a function of the position of the masking members relative to each other and the location of the aperture being a function of the position of the members with respect to the carrier.

15. A projector as claimed in any one of claims 12 to 14 in which the drive means includes monitoring means operable to monitor the position of the, or each masking member in relation to a datum position and motor means responsive to an error between the monitored position and the position demanded corresponding to the location of a selected transparency to move the, or each, drive member to reduce the error to zero.

16. A projector as claimed in claimed 15 in which the monitoring means comprises a plurality of holes arranged in a binary code at location along the masking member in its direction of movement corresponding to the pitch of the transparency array and optical binary code reading means operable to detect the position of the masking member as a number increasing from the datum position.

17. A projector as claimed in claim 1 which further comprises a machine bed and includes means operable to move the carrier and beam source together in one direction and the imaging medium in an orthogonal direction relative to the machine bed to position the imaging medium in alignment with the selected transparency.

18. A projector as claimed in claim 1 including electronic computer means operable to store for each transparency information relating to its location with respect to the carrier and responsive to selection of the transparency for projection to provide signals to the drive means to cause the transparency to be placed in the beam, movement of the masking means to align the aperture with the transparency and relative movement between the source and imaging medium to position the image on the imaging medium.

19. A projector as claimed in claim 18 in which the computer means is arranged to store for at least one transparency any deviation of the image on the transparency from a desired location thereon and operable to apply a correction signal to the drive upon selection of the transparency to correct for said deviation.

20. A projector as claimed in claim 1 in which the imaging medium is a photographic film.

21. A projector as claimed in claim 1 in which the transparency images are discrete symbols.

* * * * *